(12) United States Patent
Thompson

(10) Patent No.: US 11,567,348 B2
(45) Date of Patent: Jan. 31, 2023

(54) TEAR SHAPING FOR REFRACTIVE CORRECTION

(71) Applicant: TEAROPTIX, INC., Menlo Park, CA (US)

(72) Inventor: Vance M. Thompson, Sioux Falls, SD (US)

(73) Assignee: TearOptix, Inc., Menlo Park, CA (US)

( * ) Notice: Subject to any disclaimer, the term of this patent is extended or adjusted under 35 U.S.C. 154(b) by 367 days.

(21) Appl. No.: 16/900,341

(22) Filed: Jun. 12, 2020

(65) Prior Publication Data
US 2020/0310160 A1 Oct. 1, 2020

Related U.S. Application Data

(63) Continuation of application No. 15/858,397, filed on Dec. 29, 2017, now Pat. No. 10,684,493, which is a continuation of application No. 14/644,809, filed on Mar. 11, 2015, now Pat. No. 9,869,883.

(51) Int. Cl.
*G02C 7/04* (2006.01)
(52) U.S. Cl.
CPC .................... *G02C 7/047* (2013.01)
(58) Field of Classification Search
CPC ........... A61F 2002/1681; A61F 2/1601; B23B 51/0081; A61B 3/00; G02C 7/046–49; G02C 7/04; C02C 2202/06
USPC .... 351/159.02, 159.68, 200, 159.33, 159.18, 351/159.04, 159.34
See application file for complete search history.

(56) References Cited

U.S. PATENT DOCUMENTS

| | | | |
|---|---|---|---|
| 2,641,161 A | 6/1953 | Silvertstein |
| 3,246,941 A | 4/1966 | Moss |
| 3,416,530 A | 12/1968 | Ness |
| 3,594,074 A | 7/1971 | Rosen |
| 3,973,838 A | 8/1976 | Page |
| 3,995,635 A | 12/1976 | Higuchi et al. |
| 4,157,864 A | 6/1979 | Kilb et al. |

(Continued)

FOREIGN PATENT DOCUMENTS

CA 2 539 395 A1 4/2005
EP 0042679 A2 12/1981
(Continued)

OTHER PUBLICATIONS

Adaptive Liquid Lens by Changing Aperture, Lichun Ren, Sunwoo Park, Hongwen Ren, and Il-SOu Yoo, Journal of Microelectromechanical Systems, vol. 21, No. 4, pp. 953-958, Aug. 2012.
(Continued)

*Primary Examiner* — Travis S Fissel
(74) *Attorney, Agent, or Firm* — Merchant & Gould P.C.

(57) ABSTRACT

A lens for refractive tear shaping, having a curved lens body with a peripheral edge and a central opening therein. The central opening is shaped and sized and has a tear shaping edge structured to form a tear meniscus within the central opening. The tear meniscus being formed by interaction of a tear film of the eye and the tear shaping edge and having a posterior curvature conforming to an anterior corneal curvature and an anterior curvature. The anterior curvature is dependent on the size and shape of the central opening and structure of the tear shaping edge.

13 Claims, 9 Drawing Sheets

(56) References Cited

U.S. PATENT DOCUMENTS

| | | |
|---|---|---|
| 4,194,815 A | 3/1980 | Trombley |
| 4,201,210 A | 5/1980 | Hughes et al. |
| 4,235,985 A | 11/1980 | Ichihara et al. |
| 4,353,849 A | 10/1982 | Lewison |
| 4,464,026 A | 8/1984 | Comparetto |
| 4,652,099 A | 3/1987 | Lichtman |
| 4,744,647 A | 5/1988 | Meshel et al. |
| 4,886,350 A | 12/1989 | Wichterle |
| 5,114,686 A | 5/1992 | Gillespie |
| 5,245,367 A | 9/1993 | Miller et al. |
| 5,396,583 A | 3/1995 | Chen et al. |
| 5,580,498 A | 12/1996 | Sugiyama et al. |
| 5,658,602 A | 8/1997 | Martin et al. |
| 5,757,458 A | 5/1998 | Miller et al. |
| 5,804,107 A | 9/1998 | Martin et al. |
| 5,929,968 A | 7/1999 | Cotie et al. |
| 5,953,098 A | 9/1999 | Lieberman et al. |
| 5,980,040 A | 11/1999 | Xu et al. |
| 6,039,899 A | 3/2000 | Martin et al. |
| 6,312,393 B1 | 11/2001 | Abreu |
| 6,794,456 B2 | 9/2004 | Grobe |
| 6,880,932 B2 | 4/2005 | Doshi |
| 7,249,849 B2 | 7/2007 | Marmo et al. |
| 7,559,649 B2 | 7/2009 | Cotie et al. |
| 7,691,916 B2 | 4/2010 | McCabe et al. |
| 7,695,135 B1 | 4/2010 | Rosenthal |
| 7,699,464 B2 | 4/2010 | Iuliano |
| 7,864,440 B2 | 1/2011 | Berge |
| 8,118,426 B2 | 2/2012 | Cotie et al. |
| 8,149,512 B2 | 4/2012 | Kim et al. |
| 8,184,068 B1 | 5/2012 | Rhodes et al. |
| 8,184,069 B1 | 5/2012 | Rhodes |
| 8,216,306 B2 | 7/2012 | Coroneo |
| 8,228,315 B1 | 7/2012 | Starner et al. |
| 8,450,387 B2 | 5/2013 | McCabe et al. |
| 8,459,793 B2 | 6/2013 | de Juan, Jr et al. |
| 8,471,783 B2 | 6/2013 | Rhodes |
| 8,480,227 B2 | 7/2013 | Qiu et al. |
| 8,482,487 B1 | 7/2013 | Rhodes et al. |
| 8,506,944 B2 | 8/2013 | Sullivan et al. |
| 8,599,490 B2 | 12/2013 | Lee et al. |
| 8,736,692 B1 | 5/2014 | Wong et al. |
| 8,742,623 B1 | 6/2014 | Biederman et al. |
| 8,764,185 B1 | 7/2014 | Biederman et al. |
| 8,827,447 B2 | 9/2014 | Awasthi et al. |
| 8,864,306 B2 | 10/2014 | de Juan, Jr. et al. |
| 8,867,141 B2 | 10/2014 | Pugh et al. |
| 8,895,763 B2 | 11/2014 | Reif |
| 8,911,083 B2 | 12/2014 | Brent |
| 8,985,763 B1 | 3/2015 | Etzkorn et al. |
| 9,046,699 B2 | 6/2015 | Caldarise et al. |
| 9,198,752 B2 | 12/2015 | Woods |
| 9,310,627 B2 | 4/2016 | Havenstrite et al. |
| 9,395,557 B2 | 7/2016 | Thompson |
| 9,551,885 B2 | 1/2017 | Sindt et al. |
| 9,668,916 B2 | 6/2017 | Thompson |
| 9,869,883 B2 | 1/2018 | Thompson |
| 9,910,295 B2 | 3/2018 | Thompson |
| 10,353,220 B2 | 7/2019 | Thompson et al. |
| 10,449,086 B2 | 10/2019 | Thompson |
| 10,548,767 B2 | 2/2020 | Thompson |
| 10,678,067 B2 | 6/2020 | Thompson et al. |
| 10,684,493 B2 | 6/2020 | Thompson |
| 10,959,834 B2 | 3/2021 | Thompson |
| 2002/0063848 A1 | 5/2002 | Fiala |
| 2003/0105521 A1 | 6/2003 | Perez |
| 2003/0125498 A1 | 7/2003 | McCabe et al. |
| 2003/0162862 A1 | 8/2003 | McCabe et al. |
| 2004/0096477 A1 | 5/2004 | Chauhan et al. |
| 2005/0046794 A1 | 3/2005 | Silvestrini |
| 2006/0007391 A1 | 1/2006 | McCabe et al. |
| 2006/0132707 A1 | 6/2006 | Tung |
| 2007/0016292 A1 | 1/2007 | Perez |
| 2007/0225691 A1 | 9/2007 | Silvestrini et al. |
| 2007/0229757 A1 | 10/2007 | McCabe et al. |
| 2007/0242216 A1 | 10/2007 | Dootjes et al. |
| 2007/0298220 A1 | 12/2007 | Noda et al. |
| 2008/0002149 A1 | 1/2008 | Fritsch et al. |
| 2008/0015282 A1 | 1/2008 | McCabe et al. |
| 2008/0024717 A1 | 1/2008 | Kim |
| 2008/0182956 A1 | 7/2008 | Stanbro et al. |
| 2008/0243095 A1 | 10/2008 | Kaiser et al. |
| 2008/0316424 A1 | 12/2008 | McCabe et al. |
| 2010/0072642 A1 | 3/2010 | Broad et al. |
| 2010/0084775 A1 | 4/2010 | McCabe et al. |
| 2010/0092452 A1 | 4/2010 | Sullivan et al. |
| 2010/0133710 A1 | 6/2010 | McCabe et al. |
| 2010/0232031 A1 | 9/2010 | Batchko et al. |
| 2010/0233241 A1 | 9/2010 | Leahy et al. |
| 2011/0059902 A1 | 3/2011 | Sullivan et al. |
| 2011/0070222 A1 | 3/2011 | Sullivan et al. |
| 2011/0116034 A1 | 5/2011 | Goto et al. |
| 2011/0142908 A1 | 6/2011 | Sullivan et al. |
| 2011/0146206 A1 | 6/2011 | Stanbro et al. |
| 2011/0184358 A1 | 7/2011 | Weiner et al. |
| 2011/0273663 A1 | 11/2011 | Pugh et al. |
| 2011/0282328 A1 | 11/2011 | Ambati et al. |
| 2012/0193822 A1 | 8/2012 | McCabe et al. |
| 2012/0245444 A1 | 9/2012 | Otis et al. |
| 2012/0268711 A1* | 10/2012 | Lai .................. G02C 7/047 |
| | | 351/159.18 |
| 2012/0321611 A1 | 12/2012 | Sullivan et al. |
| 2013/0053953 A1 | 2/2013 | Silvestrini |
| 2013/0077044 A1 | 3/2013 | de Juan, Jr. et al. |
| 2013/0225715 A1 | 8/2013 | McCabe et al. |
| 2013/0237631 A1 | 9/2013 | McCabe et al. |
| 2013/0261569 A1 | 10/2013 | Weiner et al. |
| 2013/0265507 A1 | 10/2013 | Ford et al. |
| 2014/0192315 A1 | 7/2014 | Liu et al. |
| 2014/0192327 A1 | 7/2014 | Sindt et al. |
| 2014/0377327 A1 | 12/2014 | Davis et al. |
| 2015/0041736 A1 | 2/2015 | McCabe et al. |
| 2015/0092156 A1 | 4/2015 | Qiu et al. |
| 2015/0157315 A1 | 6/2015 | Theobald et al. |
| 2015/0305929 A1 | 10/2015 | Goldberg et al. |
| 2015/0366708 A1 | 12/2015 | Lerner |
| 2016/0054589 A1 | 2/2016 | Otts et al. |
| 2016/0056508 A1 | 2/2016 | Flitsch et al. |
| 2016/0067035 A1 | 3/2016 | Gontijo et al. |
| 2016/0223836 A1 | 8/2016 | Havenstrite et al. |
| 2017/0082869 A1 | 3/2017 | Sindt et al. |
| 2017/0087014 A1 | 3/2017 | Potter, Jr. et al. |
| 2017/0160432 A1 | 6/2017 | Havenstrite et al. |
| 2017/0242271 A1 | 8/2017 | Pugh et al. |
| 2017/0329053 A1 | 11/2017 | Wang et al. |
| 2018/0001581 A1 | 1/2018 | Patel et al. |
| 2020/0004046 A1 | 1/2020 | Thompson et al. |
| 2020/0085565 A1 | 3/2020 | Thompson |
| 2020/0237555 A1 | 7/2020 | Thompson |
| 2020/0301169 A1 | 9/2020 | Thompson et al. |
| 2022/0031505 A1 | 2/2022 | Thompson |
| 2022/0117723 A1 | 4/2022 | Thompson |

FOREIGN PATENT DOCUMENTS

| | | |
|---|---|---|
| EP | 1 629 317 A2 | 3/2006 |
| EP | 2 276 496 | 1/2011 |
| EP | 2 276 497 | 1/2011 |
| EP | 2 632 532 | 9/2013 |
| FR | 2740232 | 4/1997 |
| JP | 2951334 | 7/1999 |
| KR | 20050052442 A | 6/2005 |
| KR | 20-2014-003482 | 6/2014 |
| WO | WO 95/08135 | 3/1995 |
| WO | WO199734185 A1 | 9/1997 |
| WO | WO 01/33284 A1 | 5/2001 |
| WO | WO200206883 A2 | 1/2002 |
| WO | WO2003022321 A2 | 3/2003 |
| WO | WO 2004/109368 A2 | 12/2004 |
| WO | WO 2005/034730 A2 | 4/2005 |
| WO | WO 2005/121874 A1 | 12/2005 |
| WO | WO 2007/008666 A2 | 1/2007 |
| WO | WO2009069264 A1 | 6/2009 |
| WO | WO 2009/137602 A1 | 11/2009 |

(56) References Cited

FOREIGN PATENT DOCUMENTS

| WO | WO 2009/137603 A1 | 11/2009 |
|---|---|---|
| WO | WO 2010/105130 A2 | 9/2010 |
| WO | WO 2011/050287 A1 | 4/2011 |
| WO | WO2012051223 A2 | 4/2012 |
| WO | WO 2012/058382 A2 | 5/2012 |
| WO | WO2014012016 A1 | 1/2014 |
| WO | WO2014074477 A2 | 5/2014 |
| WO | WO2014100836 A2 | 6/2014 |
| WO | WO2014205252 A2 | 12/2014 |
| WO | WO2015073758 A1 | 5/2015 |
| WO | WO2016014403 A1 | 1/2016 |
| WO | WO2016090863 A1 | 6/2016 |
| WO | WO2016115369 A1 | 7/2016 |
| WO | 2016/144483 | 9/2016 |
| WO | WO2016145204 A1 | 9/2016 |
| WO | WO2017037611 A1 | 3/2017 |
| WO | WO2017053673 A1 | 3/2017 |
| WO | WO2017096087 A1 | 6/2017 |
| WO | WO2017103793 A1 | 6/2017 |

OTHER PUBLICATIONS

STIC Search.
Ciolino et al., "In vivo performance of a drug-eluting contact lens to treat glaucoma for a month", Biomaterials, 35 (2014, 432-439.
Severinsky et al., "Current applications and efficacy of sclera contact lenses—a retrospective study", 2010, 5 pages.
"Innovative drug-dispensing contact lens delivers glaucoma medication continuously for a month", Ophthalmology, Dec. 9, 2013, 2 pages.
"Piggyback Lens" for Advanced Keratoconus, prior to Dec. 6, 2013, pp. 18-19.
PCT International Search Report for International Application No. PCT/US2014/063696, dated Feb. 12, 2015.
Written Opinion for International Application No. PCT/US2014/063696, dated Feb. 12, 2015.
PCT International Search Report for International Application No. PCT/US2016/017792 dated May 11, 2016.
International Preliminary Report on Patentability for International Application No. PCT/US2016/017792, dated Sep. 12, 2017, 8 pages.
Application and File History for U.S. Appl. No. 14/644,809, filed Mar. 11, 2015. Inventor: Vance M. Thompson.
Application and File History for U.S. Appl. No. 15/858,397, filed Dec. 29, 2017. Inventor: Vance M. Thompson.
Alverez-Lorenzo, Carmen, et al., "Contact Lenses for Drug Delivery: Achieving Sustained Release with Novel Systems", 2006, Am J Drug Deliv 2006;4(3): 131-151.

* cited by examiner

TEAR SHAPING FOR REFRACTIVE CORRECTION

CROSS-REFERENCE TO RELATED APPLICATIONS

This application is a continuation of application Ser. No. 15/858,397, filed Dec. 29, 2017, entitled "Tear Shaping for Refractive Correction," now U.S. Pat. No. 10,684,493, issued Jun. 16, 2020, which in turn is a continuation of application Ser. No. 14/644,809, filed Mar. 11, 2015, entitled "Tear Shaping for Refractive Correction," now U.S. Pat. No. 9,869,883, issued Jan. 16, 2018, each of which are hereby fully incorporated herein by reference.

TECHNICAL FIELD

The invention generally relates to contact lenses and refractive correction by application of contact lenses or other structures to the eye.

BACKGROUND

Known contact lenses generally cover virtually all of the cornea or cover the cornea centrally while leaving a portion of the peripheral cornea uncovered. Contact lenses known to the Applicant achieve refractive correction because of the optical nature of an optically transparent, rigid, semi-rigid or flexible material that refracts light and thus alters the refraction of light striking the cornea and passing through the other optical parts of the eye to an image formed on the retina.

The concept of a tear lens is known to exist in the context of conventional contact lenses. The tear lens is formed by a layer of tears bounded on an anterior surface by the back of a contact lens optical zone and at a posterior surface of the tear lens by the surface of the corneal epithelium. A tear lens, as understood in this conventional sense, contributes to refractive correction primarily in the context of rigid contact lenses. This is because the posterior surface of the rigid contact lens maintains its shape and curvature independent of the shape of the cornea and affects the focusing of light in addition to the refractive power of the contact lens. While a tear lens technically exists in the context of flexible or soft contact lenses, the effect of the tear lens on refraction is negligible because of the general conformity of the soft contact lens shape to the shape of the cornea.

Numerous possible complications are known to exist with use of contact lenses on the cornea even though modern contact lenses cause fewer complications than contact lenses of decades ago. The presence of contact lenses can lead to stasis and entrapment of the tear film which can lead to an accumulation of corneal epithelial waste products in the entrapped tear film. Corneal epithelial waste products in high enough concentrations can be toxic to the cells of the corneal epithelium. Mechanical interaction between the posterior surface of the contact lens and the corneal epithelium can lead to abrasion or distortion. Entrapment of solid objects, however tiny between the posterior surface of the contact lens and the anterior corneal epithelium can also lead to corneal epithelial abrasion. Under some circumstances, the reduction of oxygen available to the corneal epithelium by having the barrier of the contact lens between the corneal epithelium and the atmosphere can lead to health complications for the corneal epithelium as well.

There is still room for improvement in the arts of refractive correction by application of lenses to the eye.

SUMMARY

The invention solves many of the above stated problems by providing a lens having a central opening which centers on the optical axis of the eye. The central opening is structured such that capillary action forms a meniscus of tears in the opening. According to an example embodiment of the invention, the inventive lens is structured so that a concave meniscus is formed. The concave meniscus is provided for correction of myopia. It is expected that a concave meniscus will form in a relatively larger diameter opening according to embodiments of the invention.

According to another example embodiment of the application, a convex meniscus is formed. A convex meniscus is expected to form in a case of a smaller diameter opening in the lens which generally overlies the optical axis of the eye.

According to another example embodiment of the invention, the opening is non-circular in structure. For example, an oval opening is expected to create a meniscus having a first curvature in a first axis and a second curvature in a second axis and thereby permitting correction of astigmatism by the tear meniscus formed. According to example embodiments of the invention, the central opening may be oval in shape or polygonal having a first axis longer than a second axis to achieve the astigmatic correction.

According to example embodiments of the invention, the cross-sectional shape of the edge or periphery of the opening may vary when viewed in cross-section.

According to an example embodiment, the cross-sectional shape of the periphery of the opening may demonstrate a thick rim. According to another example embodiment, the cross-sectional shape of the periphery of the opening may demonstrate the thin rim.

According to another embodiment, the cross-sectional shape of the periphery of the opening may demonstrate a straight rim. The straight rim may be substantially radial in orientation as compared to the curvature of the lens and opening or may be tilted to create an acute or obtuse angle relative to a tangent to the corneal surface.

According to another example embodiment of the invention, the periphery of the opening may demonstrate a concave shape when viewed in cross section.

According to another example embodiment of the invention, the periphery of the opening may demonstrate a convex shape when viewed in cross section.

According to another example embodiment of the invention, the cross-sectional shape of the periphery of the opening may demonstrate a polygonal cross-section which may be either concave or convex.

According to other example embodiments of the invention, the cross-sectional shape of the rim may vary around the circumference of the periphery of the opening. For example, a portion or portions of the periphery of the opening when viewed in cross-section may be concave while other portions may be convex.

According to another example embodiment of the invention, the perimeter of the rim may vary in shape when viewed in an anterior-posterior direction.

According to another example embodiment of the invention, the perimeter of the rim viewed anterior to posterior may have a smooth continuous curved shape.

According to another example embodiment of the invention, the perimeter of the rim when viewed anterior to posterior may include indentations in the rim perimeter.

According to another example embodiment of the invention, the rim perimeter may include appendages extending inwardly from the rim.

According to another example embodiment of the invention, the periphery of the opening when viewed in an anterior to posterior direction may have a circular shape. According to another example embodiment of the invention, the periphery of the opening when viewed in an anterior to posterior direction may have an oval shape and according to another example embodiment of the invention, the periphery of the opening in viewed in an anterior to posterior direction may have a polygonal shape. The polygonal shape may include a regular polygon or an irregular polygon shape. The polygon may be generally radially symmetrical or may be other than radially symmetrical.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
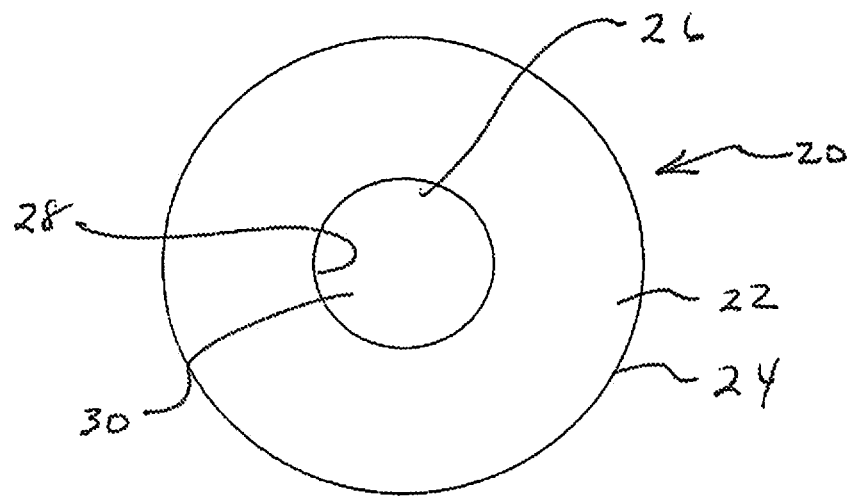
FIG. 1 is an anterior to posterior view of a lens for refractive tear shaping having a circular central opening therein.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIGS. 1-13, the invention is directed to lens for refractive tear shaping 20 wherein refractive correction is achieved or enhanced by the shaping of the tear film.

Referring particularly to FIGS. 1-6, lens for refractive tear shaping 20 according to an example embodiment of the invention generally includes lens body 22 having peripheral edge 24 and defining central opening 26. Central opening 26 is surrounded by a tear shaping edge 28. According to the depicted embodiment, tear shaping edge 28 defines circular central opening 30. Tear shaping edge 28 can have a number of cross sectional structures and shapes as described below.

Figure 2:
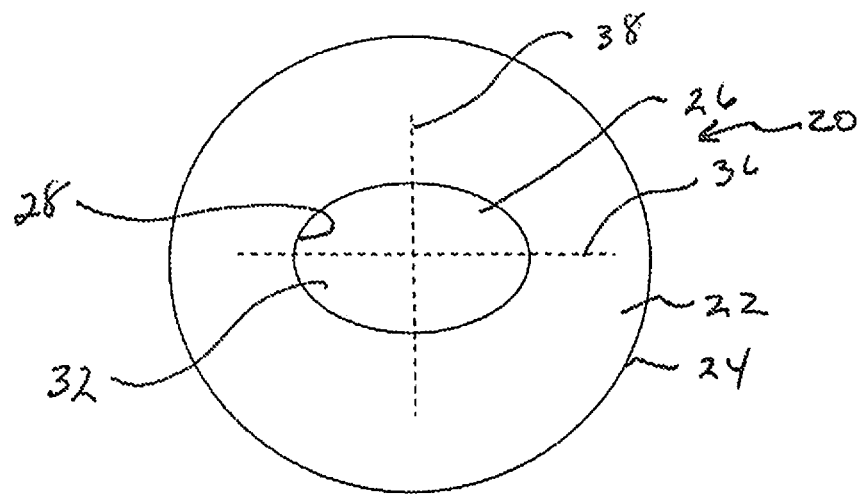
FIG. 2 is an anterior to posterior view of a lens for refractive tear shaping having an oval central opening therein.

Referring now to FIG. 2, another embodiment of lens for refractive tear shaping 20 is depicted. The depicted embodiment includes lens body 22 having peripheral edge 24 and elliptical or oval central opening 32. Elliptical or oval central opening 32 is bounded by tear shaping edge 28.

Figure 3:
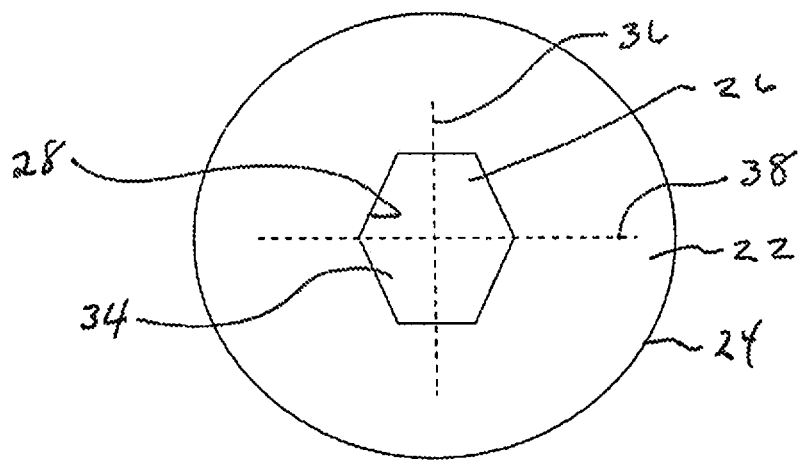
FIG. 3 is a lens for refractive tear shaping having a polygonal opening therein.

Referring to FIG. 3, another embodiment of lens for refractive tear shaping 20 is depicted having polygonal central opening 34. Polygonal central opening 34 is depicted as an irregular hexagon, however polygonal central opening 34 may have more or less than six sides and six vertices.

Referring particularly to FIGS. 2 and 3, elliptical or oval central opening 32 and polygonal central opening 34 may have long axis 36 and short axis 38.

Figure 4:
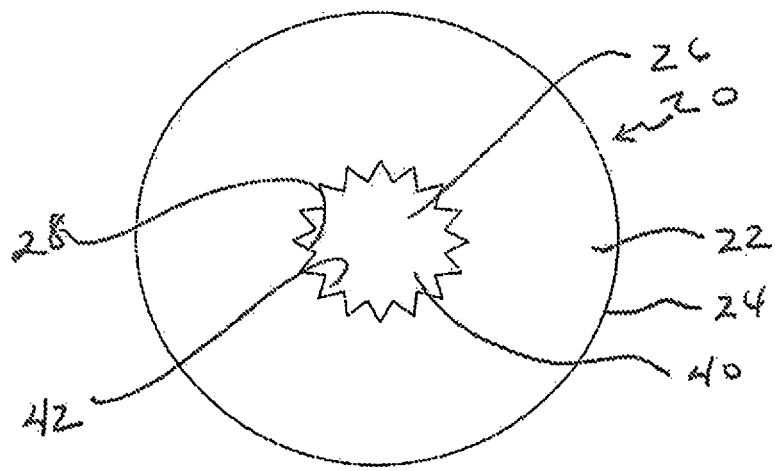
FIG. 4 is an anterior to posterior view of a lens for refractive tear shaping having a stellate opening with indentations according to an example embodiment of the invention.

Referring now to FIG. 4, according to another embodiment, lens for refractive tear shaping 20 defines stellate opening 40 having indentations into the material of the lens surrounding stellate opening 40. While stellate opening 40 is depicted as circularly symmetrical, stellate opening 40 may also have long axis 36 and short axis 38.

Figure 5:
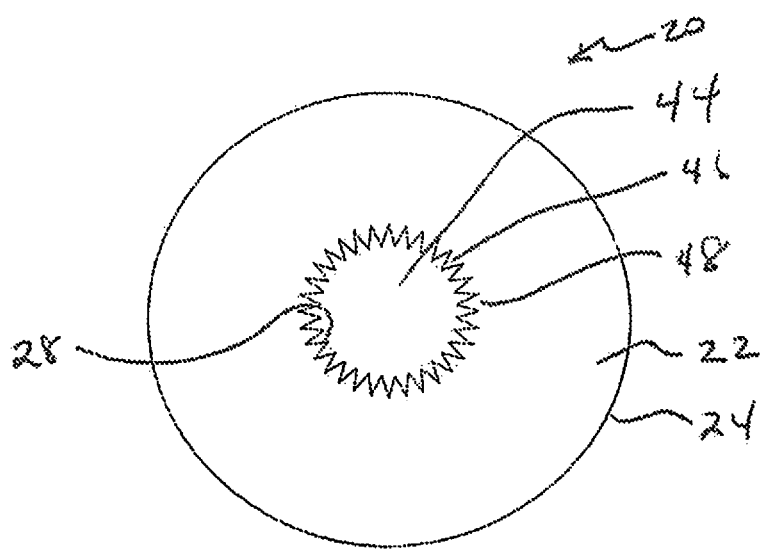
FIG. 5 is an anterior to posterior view of a lens for refractive tear shaping having a stellate opening with appendages according to an example embodiment of the invention.

Referring now to FIG. 5, another embodiment of lens for refractive tear shaping 20 is depicted. According to the depicted embodiment, stellate opening with appendages 44 is depicted. Appendages 46 extend inwardly from outer edge 48. While depicted as circularly symmetrical, stellate opening with appendages 44 may also have long axis 36 and short axis 38.

Figure 6:
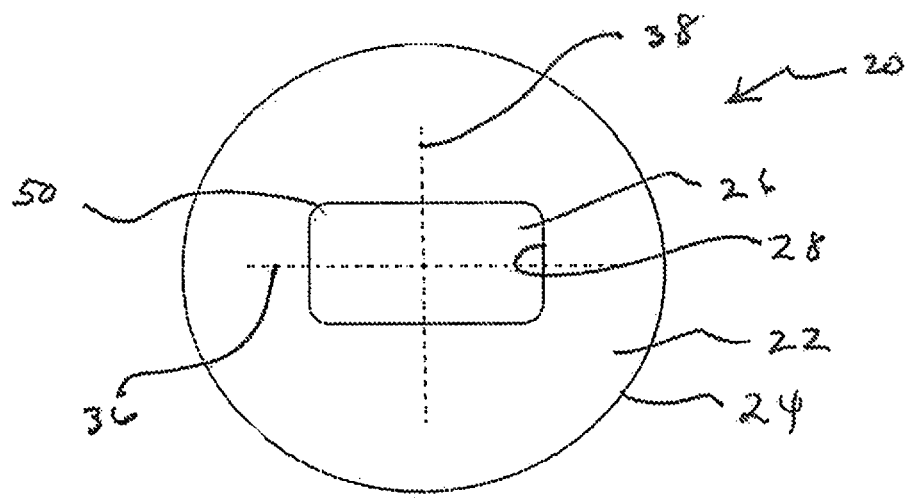
FIG. 6 is an anterior to posterior view of a lens for refractive tear shaping having a generally rectangular polygonal opening therein according to an example embodiment of the invention.

Referring now to FIG. 6, lens for refractive tear shaping 20 with rectangular opening 50 is depicted. Rectangular opening 50 is depicted having a particular proportional aspect ratio, however this should not be considered limiting as the aspect ratio of rectangular opening 50 may be altered by altering the length of long axis 36 as compared to short axis 38.

Referring now to FIGS. 7-13, cross-sectional views of example embodiments of lens for refractive tear shaping 20 are depicted.

Figure 7:
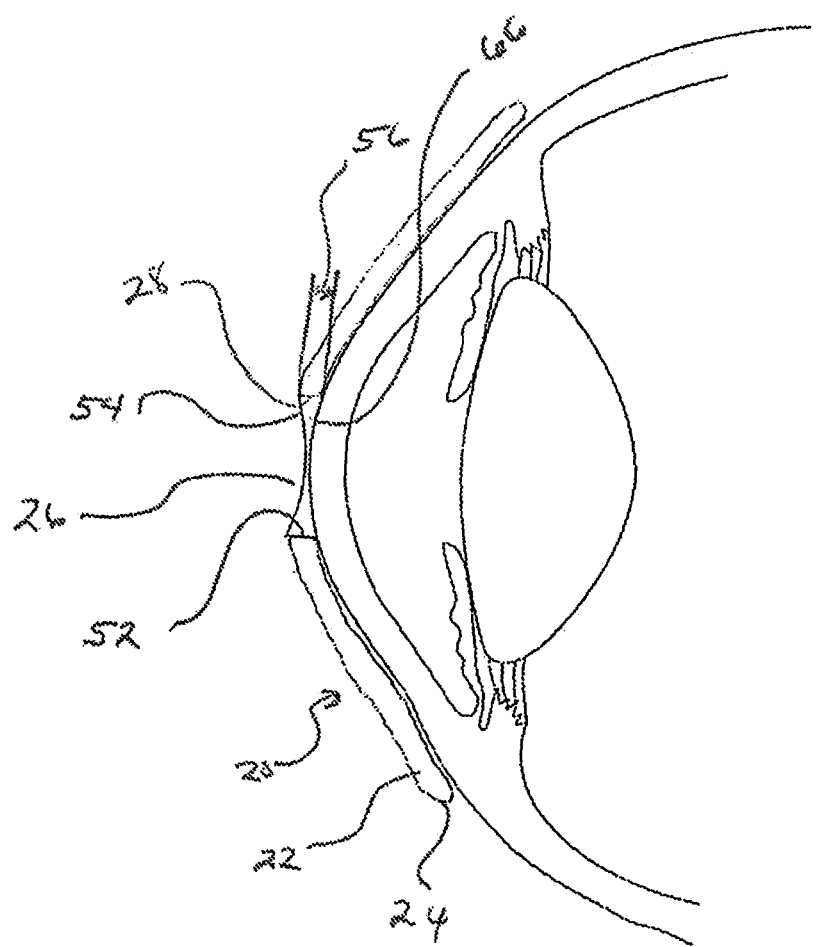
FIG. 7 is a cross-sectional view of a lens for refractive tear shaping in situ on a cornea and with a concave tear meniscus according to any example embodiment of the invention.

Referring particularly to FIG. 7, an embodiment of the invention including parallel tear shaping edge 52 is depicted. It is noted that lens body 22 in the embodiment depicted in FIG. 7 that parallel tear shaping edge 52 is generally parallel on opposing sides of central opening 26. Also depicted in FIG. 7 is concave tear meniscus 54. Concave tear meniscus 54 affects a negative refractive power due to its concave shape and is expected to contribute focusing power for correction of myopia. It is expected that the concavity of concave tear meniscus 54 will vary with the size of central opening 26 and with the depth 56 of tear shaping edge 28.

It is expected that to a certain point smaller diameter of central opening 26 will create a more steeply curved concave tear meniscus imparting greater negative refractive power and stronger correction for myopia. It is also expected that increasing depth 56 of tear shaping edge 28 will increase negative refractive power to a certain degree. As discussed above, central opening 26 may have various shapes, some of which include a long axis 36 and short axis 38.

It is expected that by judicious selection of the size of long axis 36 and short axis 38 that astigmatism may be corrected by creating a concave tear meniscus 54 having different shape and therefore differing power on various meridians.

Figure 8:
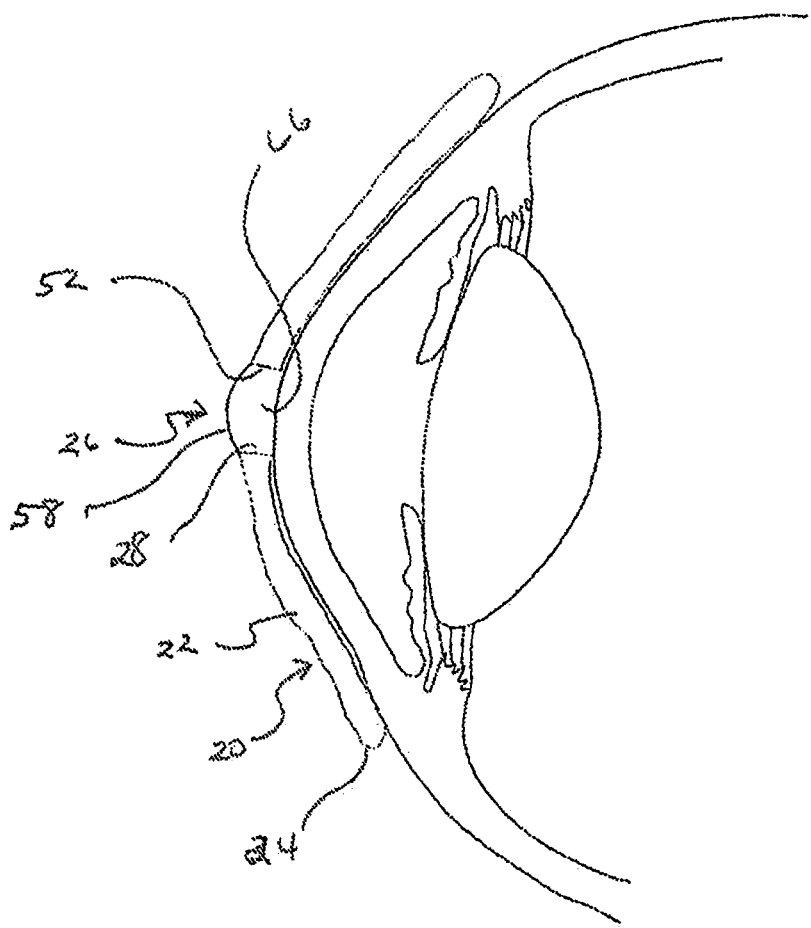
FIG. 8 is a cross-sectional view of a lens for refractive tear shaping in situ on a cornea with a convex tear meniscus according to an example embodiment of the invention.

Referring now to FIG. 8, lens for refractive tear shaping 20 having parallel tear shaping edge 52 is sized and configured to create convex tear meniscus 58. It is expected that when the size of central opening 26 is reduced to a sufficient degree, convex tear meniscus 58 will be formed in central opening 26. FIG. 8 depicts parallel tear shaping edge 52 along with a smaller diameter central opening 26 than does FIG. 7. It is expected that when the size of central opening 26 and depth 56 of tear shaping edge are appropriate convex tear meniscus 58 will be formed.

Figure 9:
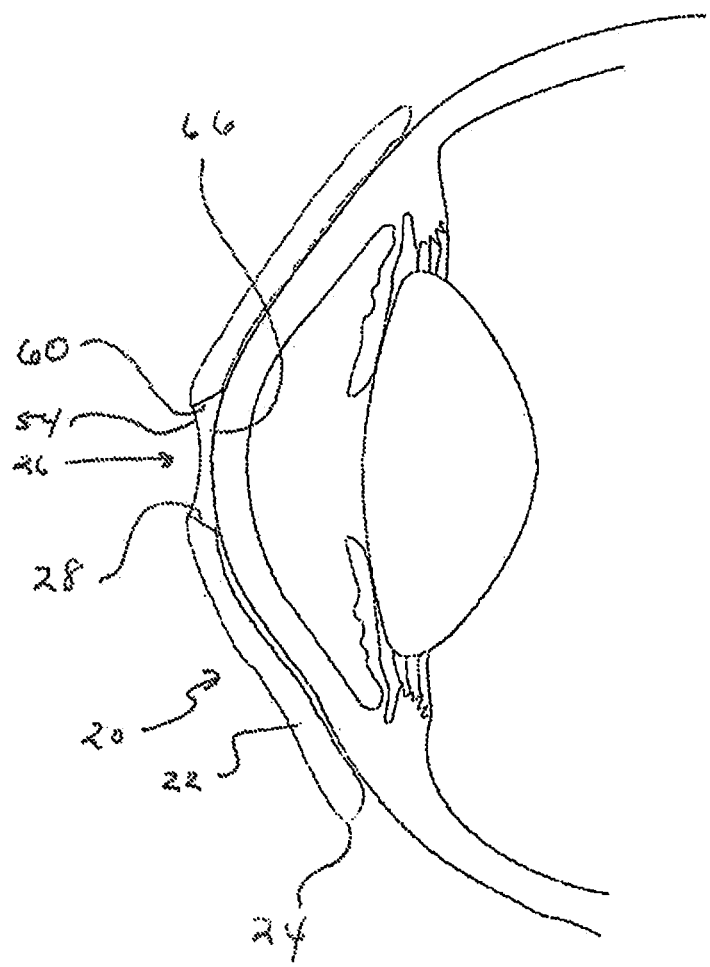
FIG. 9 is a cross-sectional view of a lens for refractive tear shaping in situ on a cornea with a central opening having inward angled edges and a concave tear meniscus according to an example embodiment of the invention.

Referring now to FIG. 9, lens for refractive tear shaping 20 with anterior acute tear shaping edge 60 is depicted. It is noted that anterior acute tear shaping edge 60 is arranged so that tear shaping edge 28 narrows from posteriorly-to-anteriorly. Concave tear meniscus 54 is also depicted. It is expected that anterior acute tear shaping edge 60 will create a more concave tear meniscus 54 thus, creating greater negative refractive power to concave tear meniscus 54.

Figure 10:
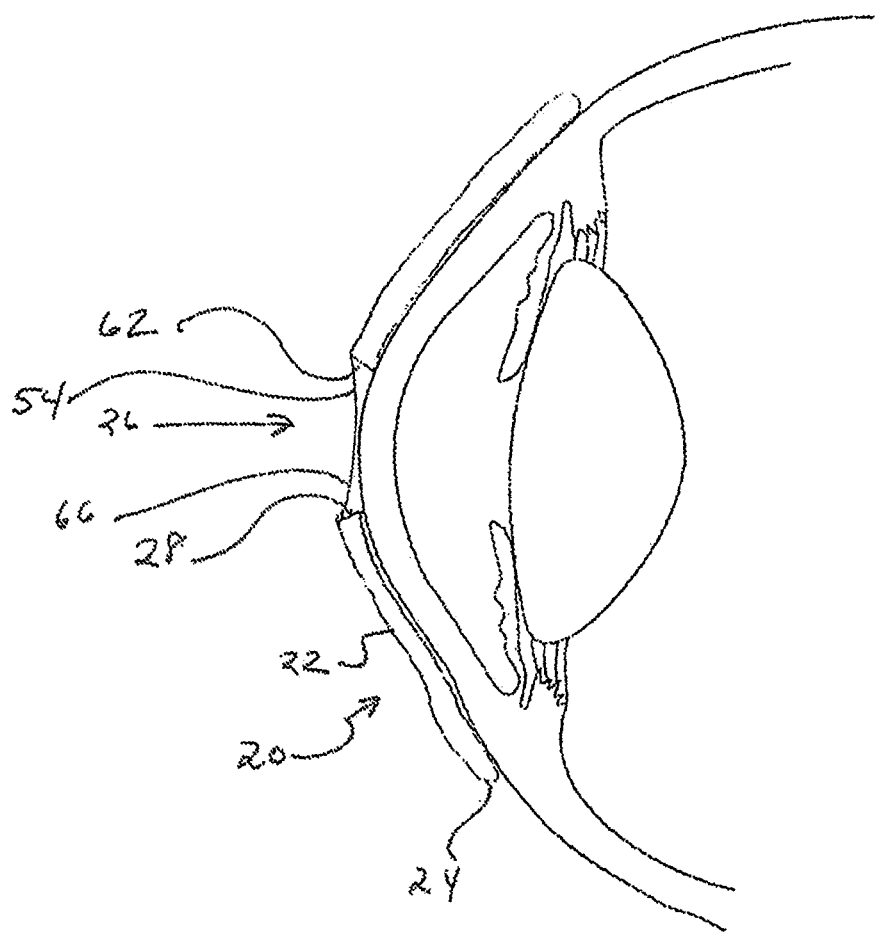
FIG. 10 is a cross-sectional view of a lens for refractive tear shaping in situ on a cornea with a concave tear meniscus and outwardly angled edges according to an example embodiment of the invention.

Referring now to FIG. 10, lens for refractive tear shaping 20 having anterior obtuse tear shaping edge 62 is depicted. Anterior obtuse tear shaping edge 62 is structured so that central opening 26 is wider anteriorly and narrower posteriorly. It is expected that anterior obtuse tear shaping edge 62 will create a flatter concave tear meniscus 54 as depicted in FIG. 10 thus, creating a concave tear meniscus having less negative refractive power than parallel tear shaping edge 52 having a similar posterior diameter.

Figure 11:
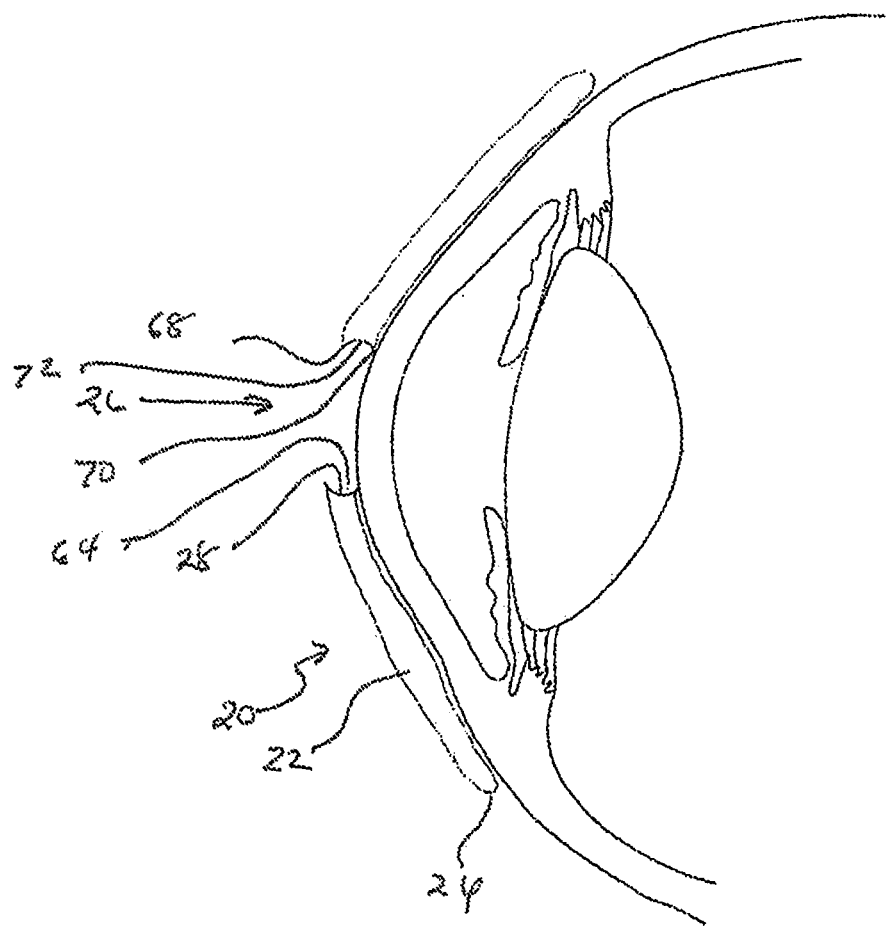
FIG. 11 is a cross-sectional view of a lens for refractive tear shaping having an opening with concave peripheral edges according to an example embodiment of the invention with the tear meniscus not depicted.

Referring now to FIG. 11, lens for refractive tear shaping 20 having concave tear shaping edge 64 is depicted. In FIG. 11, no tear meniscus 66 is depicted for clarity. Concave tear shaping edge 64 includes anterior edge 68, posterior edge 70 and concave portion 72.

Figure 12:
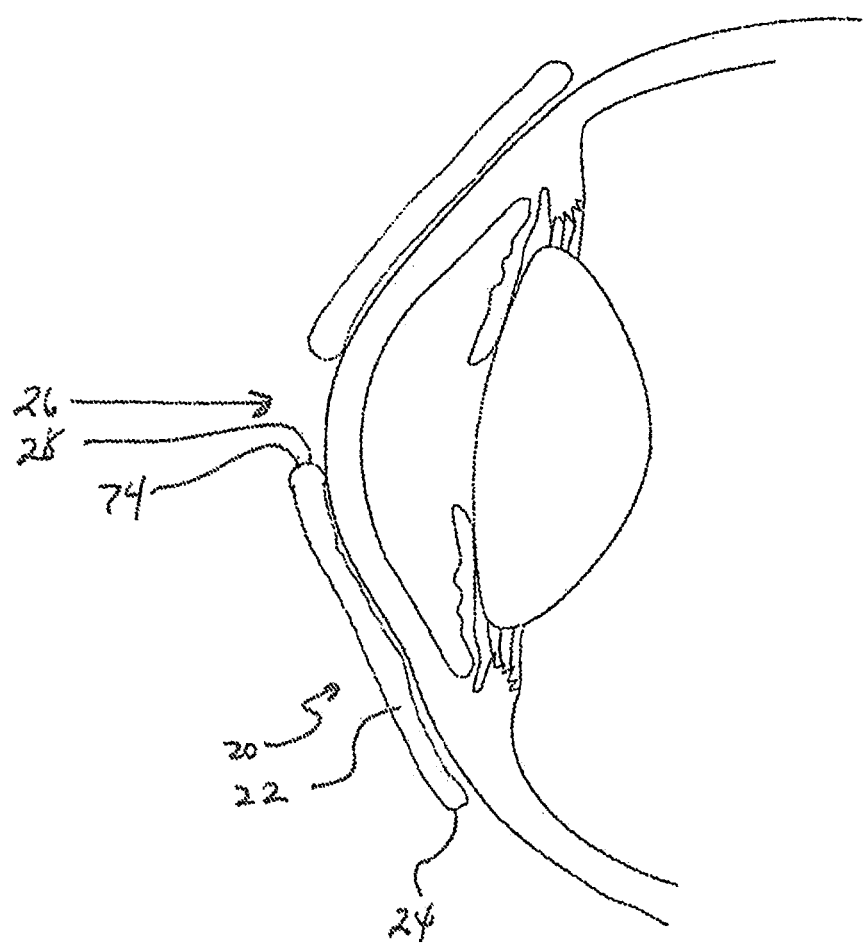
FIG. 12 is a cross-sectional view of a lens for refractive tear shaping having an opening with convex peripheral edges in situ on a cornea according to an example embodiment of the invention with the tear meniscus not depicted.

Referring now to FIG. 12, lens for refractive tear shaping 20 with convex tear shaping edge 74 is depicted. No tear meniscus 66 is depicted for clarity. In the depicted embodiment, convex tear shaping edge 74 has a radius of curvature approximately equal to half of depth 56 of tear shaping edge 20. This should not be considered limiting however as the radius of curvature of convex tear shaping edge 74 may vary.

Figure 13:
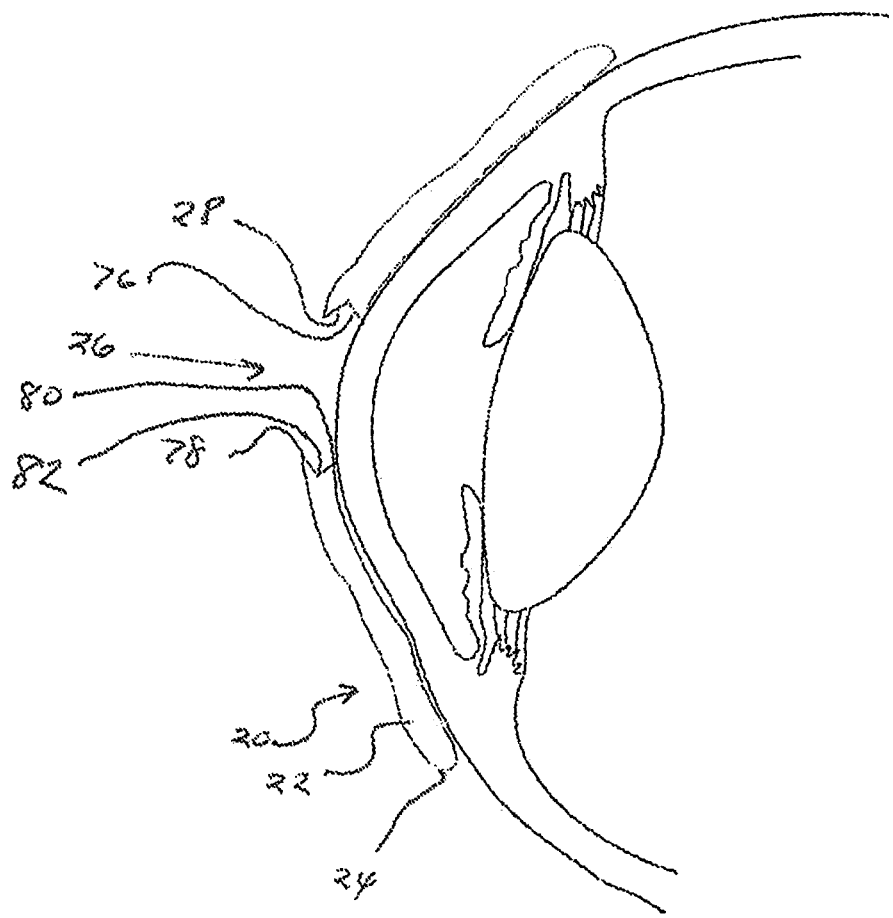
FIG. 13 is a lens for refractive tear shaping in situ on a cornea with an opening having polygonal peripheral edges with the tear meniscus not depicted.

Referring now to FIG. 13, lens for refractive tear shaping 20 with faceted tear shaping edge 76 is depicted. Faceted tear shaping edge 76 presents anterior edge 78, posterior edge 80 and internal angle portion 82.

Lens for refractive tear shaping 20 according to the various embodiments described herein may be formed from hydrogel polymers of the types used in soft contact lens that are now available or any hydrogel polymer materials to be developed in the future. Hydrogel polymers are generally water absorbent and hydrogel polymers may be used to manufacture lenses for refractive tear shaping 20 according to the invention by methods including but not limited to lathe cutting, cast molding, spin casting and injection molding. Lenses for refractive tear shaping 20 may also be manufactured from rigid oxygen permeable materials by known manufacturing processes including lathe cutting. It is to be understood that lens for refractive tear shaping 20 may be manufactured by any known contact lens manufacturing process or contact lens manufacturing processes to be developed in the future.

Lenses for refractive tear shaping 20 are expected to be made in diameters ranging from approximately 5 mm to 16 mm. Certain features of lens for refractive tear shaping 20 such as central opening 26 diameter, the structure of tear shaping edge 28, the appropriate length of long axis 36 and short axis 38 to achieve desired refractive correction are expected to be developed with a certain degree of experimentation. It is expected that this degree of experimentation will not be undue and that those of ordinary skill in the art based on the present application disclosure will be able to engage in such experimentation without significant difficulty.

It is expected that for formation of concave tear meniscus 54, that smaller diameter central openings 26 will result in higher refractive power of concave tear meniscus 54, thus permitting higher degrees of refractive correction for myopia. It is also expected that when the diameter of central opening 26 becomes sufficiently small, tear meniscus 66 will transition from concave tear meniscus 54 to convex tear meniscus 58. Determination of this transition diameter for transition is expected to be achievable by reasonable levels of experimentation.

The effect of depth 56 of tear shaping edge 28 on refractive power of tear meniscus 66 also should be determinable by reasonable experimentation. It is expected that greater depth 56 will generally create a thicker periphery of tear meniscus 66 resulting in higher degrees to concavity of concave tear meniscus 54 and greater myopic correction.

Further, understanding of the effect of other features of the disclosed lenses including anterior acute tear shaping edge 60, anterior obtuse tear shaping edge 62, concave tear shaping edge 64, convex tear shaping edge 74 and faceted tear shaping edge 76 are expected to be achieved by reasonable experimentation well within the ability of one of ordinary skill in the art. It is expected that such experimentation will not be undue. It is also expected that the effect of stellate opening 40 with indentations 42 as well as stellate opening with appendages 44 and appendages 46 can also be determined experimentally.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of making a corneal contact lens for refractive tear shaping, the method comprising:
    selecting an refractive correction for the corneal contact lens, the refractive correction comprising an amount of refractive correction and a type of refractive correction;
    determining a size, a shape and an edge shape of a central opening to be formed in the corneal contact lens, wherein the size, the shape and the edge shape are configured to shape a tear on a cornea of an eye within the central opening to provide the refractive correction;
    forming the central opening in a curved lens body, wherein the curved lens body comprises a peripheral edge, and wherein the central opening comprises a full thickness opening extending from an anterior surface of the curved lens body to a posterior surface of the curved lens body.

2. The method of claim 1, wherein the shape of the central opening is selected from the group consisting of circular, rectangular, oval, elliptical, polygonal and stellate.

3. The method of claim 1, wherein the edge shape, when viewed in cross section, is selected from the group consisting of straight, curved, concave, convex, indented, anteriorly acute and anteriorly obtuse.

4. The method of claim 1, wherein the edge shape is the same, when viewed in cross section, around a circumference of the central opening.

5. The method of claim 1, wherein the edge shape varies, when viewed in cross section, around a circumference of the central opening.

6. The method of claim 1, wherein the edge shape has no sharp edges or corners.

7. A corneal contact lens for refractive tear shaping, the corneal contact lens comprising:
    a curved lens body having a peripheral edge; and
    a central opening in the curved lens body, wherein a size, a shape and an edge shape of the central opening are configured to shape a tear on a cornea of an eye within the central opening to provide a preselected amount and type of refractive correction to an eye upon which the corneal contact lens is placed.

8. The corneal contact lens of claim 7, wherein the size of the central opening is configured to shape the tear on the eye to have a tear shape selected from the group consisting of convex, concave and plano.

9. The corneal contact lens of claim 7, wherein the shape of the central opening is selected from the group consisting of circular, oval, elliptical, rectangular, polygonal and stellate.

10. The corneal contact lens of claim 7, wherein the edge shape, when viewed in cross section, is selected from the group consisting of straight, curved, concave, convex, indented, anteriorly acute and anteriorly obtuse.

11. The corneal contact lens of claim 7, wherein the edge shape is the same, when viewed in cross section, around a circumference of the central opening.

12. The corneal contact lens of claim 7, wherein the edge shape varies, when viewed in cross section, around a circumference of the central opening.

13. The corneal contact lens of claim 7, wherein the edge shape has no sharp edges or corners.

* * * * *